(12) United States Patent
Hunt et al.

(10) Patent No.: US 9,910,835 B2
(45) Date of Patent: Mar. 6, 2018

(54) USER INTERFACE FOR CREATION OF CONTENT WORKS

(71) Applicant: Inkling Systems, Inc., San Francisco, CA (US)

(72) Inventors: Christopher Hunt, San Francisco, CA (US); Chanpory Rith, San Francisco, CA (US); Chatree Campiranon, Mountain View, CA (US); Olof Alexander Mathé, San Francisco, CA (US); Andy Perelson, San Francisco, CA (US); Michael Chen, San Francisco, CA (US)

(73) Assignee: INKLING SYSTEMS, INC., San Francisco, CA (US)

( * ) Notice: Subject to any disclaimer, the term of this patent is extended or adjusted under 35 U.S.C. 154(b) by 88 days.

(21) Appl. No.: 14/692,393

(22) Filed: Apr. 21, 2015

(65) Prior Publication Data
US 2015/0301993 A1 Oct. 22, 2015

Related U.S. Application Data

(60) Provisional application No. 61/982,273, filed on Apr. 21, 2014.

(51) Int. Cl.
| | |
|---|---|
| *G06F 17/00* | (2006.01) |
| *G06F 17/22* | (2006.01) |
| *G06F 3/0481* | (2013.01) |
| *G06F 3/0482* | (2013.01) |
| *G06F 17/24* | (2006.01) |
| *G06F 3/0486* | (2013.01) |

(52) U.S. Cl.
CPC ........ *G06F 17/2247* (2013.01); *G06F 3/0482* (2013.01); *G06F 3/0486* (2013.01); *G06F 3/04817* (2013.01); *G06F 17/24* (2013.01)

(58) Field of Classification Search
CPC ....................................... G06F 3/048–3/04897
See application file for complete search history.

(56) References Cited

U.S. PATENT DOCUMENTS

| | | | | |
|---|---|---|---|---|
| 9,411,899 | B2 * | 8/2016 | Godsey | G06F 3/0482 |
| 2004/0216055 | A1 * | 10/2004 | Boyles | G06F 3/04842 |
| | | | | 715/779 |
| 2007/0156651 | A1 * | 7/2007 | Weigel | G06F 17/30616 |
| 2008/0172407 | A1 * | 7/2008 | Sacks | G06Q 10/10 |
| 2009/0063517 | A1 * | 3/2009 | Wright | G06F 17/30274 |
| 2009/0063547 | A1 * | 3/2009 | Wright | G06F 17/30274 |
| 2010/0241997 | A1 * | 9/2010 | Arakane | G06F 3/0482 |
| | | | | 715/854 |
| 2010/0281360 | A1 * | 11/2010 | Arakane | G06F 3/0482 |
| | | | | 715/244 |
| 2012/0198325 | A1 * | 8/2012 | Kief | G06F 17/2241 |
| | | | | 715/234 |

(Continued)

*Primary Examiner* — Keith Bloomquist
(74) *Attorney, Agent, or Firm* — Ascenda Law Group, PC

(57) ABSTRACT

A system, computer-readable storage medium, and computer-implemented method for editing content works, such as publications using markup language, via a user interface having panel of patterns, are presented. The disclosure includes approaches for editing and creating patterns based on selected representations of markup elements and other content, and also features of the user interface that enable use of the patterns for modifying content works.

14 Claims, 13 Drawing Sheets

(56) References Cited

U.S. PATENT DOCUMENTS

| | | | | |
|---|---|---|---|---|
| 2014/0053060 A1* | 2/2014 | Walker | ................ | G06F 17/2247 715/234 |
| 2014/0215408 A1* | 7/2014 | Park-Ekecs | ........... | G06F 3/0483 715/854 |
| 2014/0258843 A1* | 9/2014 | Krueger | .............. | G06F 17/2247 715/234 |

* cited by examiner

FIG. 11
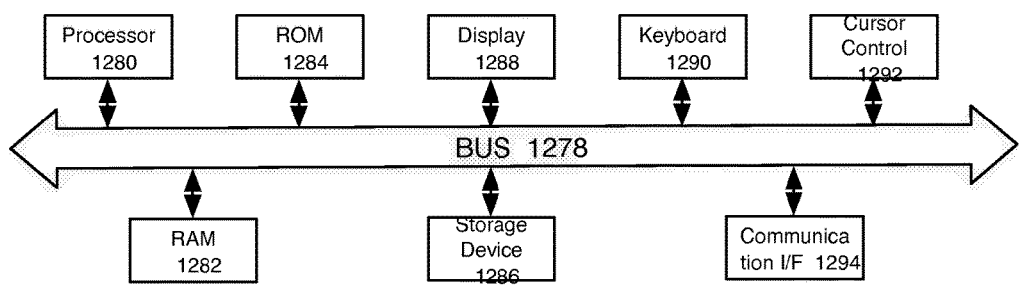
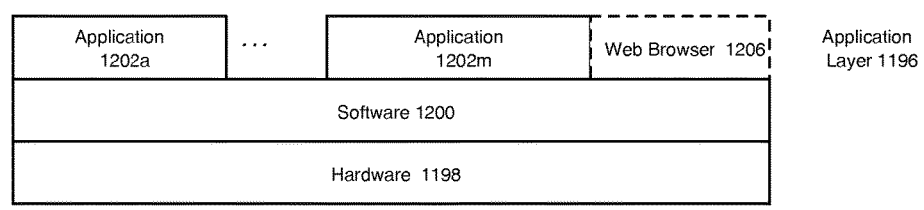
FIG. 12

USER INTERFACE FOR CREATION OF CONTENT WORKS

CROSS-REFERENCE TO RELATED APPLICATIONS

This application claims priority to U.S. Provisional Application No. 61/982,273, filed on Apr. 21, 2014, which is incorporated herein by reference in its entirety.

FIELD OF THE INVENTION

Various embodiments relate to user interfaces displayed on a display of an electronic device.

BACKGROUND

Development of traditional print media and other rich content (e.g., textbooks, travel books, magazines, cookbooks, how-to books, literature, and the like) involves many tasks, including managing the content creation and editing process. As print media have transitioned to electronic media, content creators and editors have been forced to either develop computer coding skills or rely on others with those skills. There is a need for more user-friendly user interfaces for providing rich content, while also providing control and precision through new user interface elements and direct editing of the markup language.

SUMMARY

This disclosure includes examples of a system, computer-readable storage medium, and computer-implemented method for editing content works, such as publications using markup language, via a user interface having a panel of patterns. The disclosure includes approaches for editing and creating patterns based on selected representations of markup elements and other content, and also features of the user interface that enable use of the patterns for modifying content works. These editing approaches may include dragging and dropping discrete patterns of markup language and other content into a preview of the publishable content. They may also include advanced editing techniques such that a user may combine simple and intuitive editing with precision editing through direct editing of markup in a user interface and integrated user interface tools such as the breadcrumb element.

These examples may be combined in any permutation or combination. This overview is not intended to provide an exclusive or exhaustive explanation of the embodiments of the invention. The detailed description is included to provide further information about the present patent application.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which:

FIG. 11 is an exemplary computer system in accordance with some embodiments of the invention;

FIG. 12 is an exemplary computer system in accordance with some embodiments of the invention;

DETAILED DESCRIPTION

Methods, computer-readable media, and systems for a user interface for software tools, for example, a content editing tool, are provided. In some embodiments, a user interface is presented with a preview of a rendering of a content work written in a markup language within a target environment (e.g., with the use of a particular browser, a particular device, a reader application, and/or a printed publication). The user may select representations of portions of the rendered content work from the preview displayed within the user interface to designate that the underlying markup language elements and/or content data (e.g., text, images, etc.) corresponding to the selected representations of rendered content are to be used for creation of a pattern. The underlying markup in markup files for the content work used to render the selected representations may be used to create a new pattern and/or incorporated into a pattern.

A "pattern" is a defined set of one or more markup language elements, metadata, and/or content data, which can be inserted directly into a selected position within a content work using the content editing tool user interface. In some embodiments, a pattern icon for a pattern on a user interface may be dragged and dropped onto a rendering of a content work at a particular position to trigger the corresponding markup language, metadata, and content data of the pattern to be placed into the content work at or near the particular position within the underlying markup file. In particular, the present invention provides a graphical user interface for a content editing tool with various options that provide users the ability to quickly preview and insert defined patterns of markup elements and/or content data in context within new or existing digital content works as part of the content creation or editing process. Additionally, the user may be able to create reusable patterns by selecting representations of rendered content within a preview panel and requesting creation of a new pattern with the selected representations. In some cases, embodiments permit users with no or limited knowledge of computer coding techniques or experience with markup languages a convenient way to assess, access, create, and employ the use of a pattern of markup elements as part of a content creation or editing process.

In some embodiments, the content works may consist of containers such as "cards" or "media cards." These cards may be predefined templates for digital content works that include, among other things, one or more text sections, one or more image sections, image captions, and header sections, all arranged in a desired order. A collection of related cards may form a digital content work, for example an electronic book, magazine, article, etc., or a portion thereof, e.g., a section or chapter thereof, etc.

Figure 1:
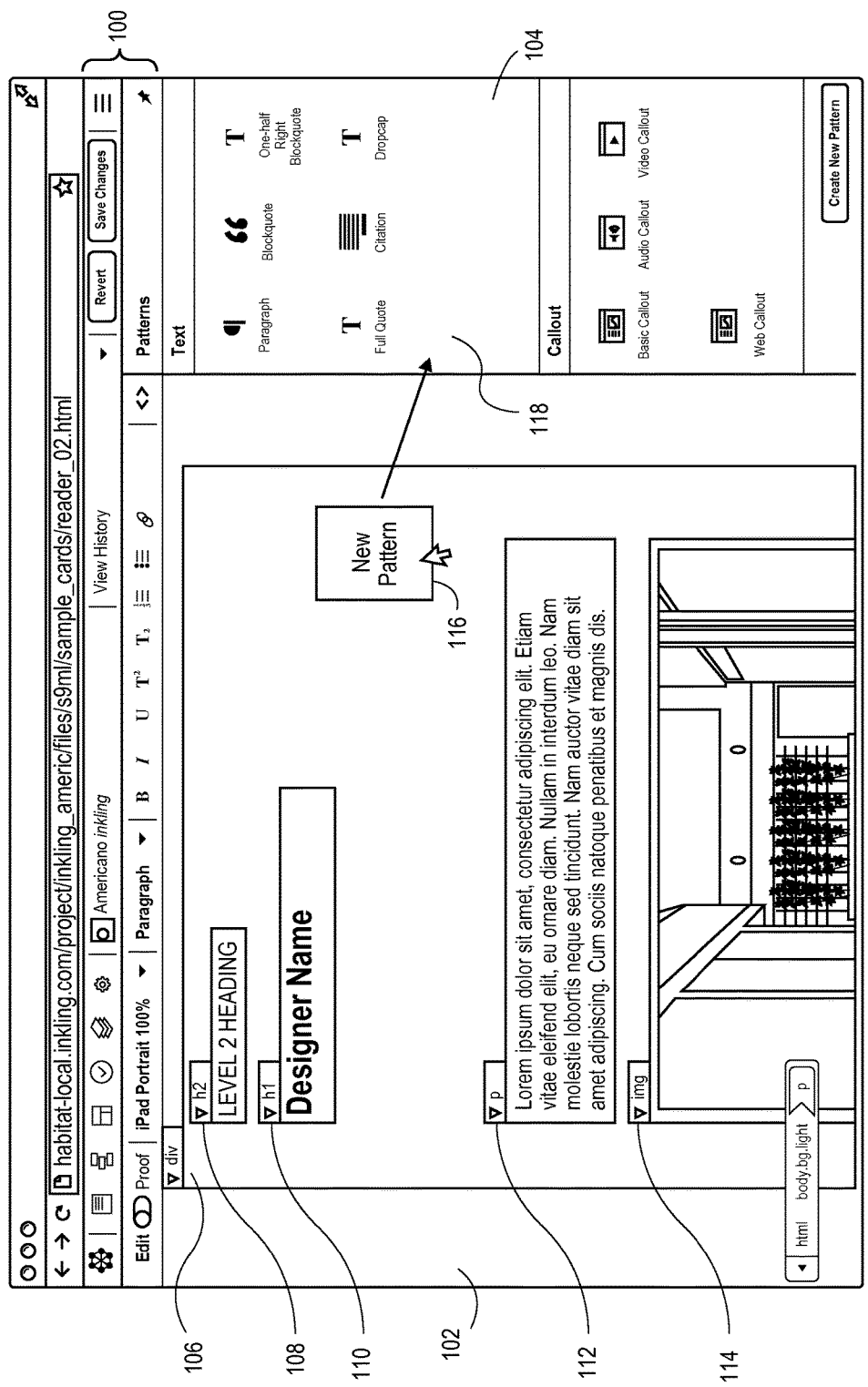
FIG. 1 is an exemplary user interface in accordance with some embodiments of the invention.

FIG. 1 is an exemplary user interface 100 in accordance with some embodiments of the invention. User interface 100 is a graphical user interface for a content editing tool with a presentation panel 102 and a pattern library panel 104. Techniques for creating and editing digital content works that may be used in some embodiments are described in International Patent Application No. PCT US2014/15818 and are herein incorporated by reference. The presentation panel 102 provides a preview of a rendering of the content work (e.g., a file, a card, an image and/or other portion of the content work) within a target environment. Markup language elements are used within a content work to instruct the software on the actions to be performed for rendering the content work. For example, markup elements may be tags "<h1>" and "</h1>" that surround text of a content work with "<h1>text</h1>" to indicate that the "text" should be displayed with a font and a font size predefined for the "h1" tag. Markup languages include, but are not limited to, the following: HTML, XML, and XHTML. The target environment may be the software (e.g., browser) and/or device (e.g., mobile device or laptop device) that the content editor intends for the content work to be displayed, and the presentation panel may provide a preview of the anticipated rendering of the content work within the target environment. In some embodiments, the target for the content work may be a print publication, and the content work may be rendered to depict the target of a printed content work.

The pattern library panel 104 provides pattern icons (e.g., "Paragraph," "Blockquote," icons for interactive content applications, etc.), and the user may provide input to select a pattern icon and position the pattern icon within the rendering of the content work on the presentation panel 102 to trigger the inclusion of the grouping of markup language elements and/or content data that are defined for the pattern into the content work at or near that position. The interactive content applications are computer-executable and/or interpretable applications (usually of limited or special purpose functionality) that can be installed and executed within a card (e.g., within a secure HTML iFrame provided by a reader platform in which a card is rendered). Techniques for interactive content applications described in U.S. patent application Ser. No. 13/766,434 may be used in some embodiments, and are herein incorporated by reference. The corresponding grouping of markup language elements and/or content data may be inserted into the underlying markup file for the rendered content work at/or near the position designated by the user within the rendering.

As shown, the user may select representations of rendered content (e.g., 106, 108, 110, 112, and 114) from the content work of the presentation panel 102 for inclusion into a new pattern. Representations may be displayed to indicate to the user that the representations are selected with display of a dialog (as shown), such as "div" in 106 that is displayed within the user interface after selection, the "h2" in 108, or the "p" in 112. For example, in the embodiment shown in FIG. 1, the displayed "div", "h2", and "p" in rendered content 106, 108, and 112 (i.e., the corresponding type of markup element) are not shown when the respective rendered content item is not selected. In certain embodiments, a representation of rendered content corresponding to the current available location may be highlighted by displaying a visible border around the element, as shown in element 110 in FIG. 1.

In some implementations, representations are indicated as selected by displaying the selected representations as highlighted (e.g., displayed in a different color than the other representations) within the user interface. Those with skill in the art will recognize that any visual indicator may be used to indicate selection of the representations within the user interface. The selection of at least one representation may trigger the display of a new pattern icon 116, and the user may position the new pattern icon 116 within a target region 118 (e.g., in this case the pattern library panel 104) to indicate the user's desire to create the new pattern for a pattern library of the content editing tool. The new pattern may include the markup elements and/or content (e.g., text, images, other content data) from the selected representations of the content work.

In some embodiments, the user may position the new pattern icon 116 over an existing pattern icon to trigger the inclusion or incorporation of the underlying markup language elements and content data of the selected representations into the existing pattern (represented by the pattern icon).

In other embodiments, a particular type of markup language elements from selected representations may form a class grouping (e.g., all "class" type markup elements from a selected representation associated with a selected markup element) and/or markup elements associated with a particular markup element tag (e.g., markup element attribute name and value pairs that are associated with a "body" tag and/or related to a "body" tag, "class" markup elements associated with a particular markup element tag, etc.) may form a class grouping for a markup language element type. For example, markup language elements found in markup files associated with a particular markup element tag in a selected representation may be used to form a class grouping.

A "class grouping" is a pattern of markup language elements, content data, and/or metadata for a particular markup element tag, such as a "body" tag. For example, the class grouping may be a "class" markup element for a particular markup element tag that may be saved as a "class grouping" for the particular markup element tag. Continuing with the example, the class grouping may be a "class" that applies a style to a markup element tag.

The markup elements found in the selected representations for a particular markup element tag of rendered content in the presentation panel may be grouped to form a "class grouping" pattern of markup elements (e.g., a style) that may be presented to the user for selection and inclusion into a content work for the particular type of markup language element of a content work. By way of example, a class may be saved as a "class grouping" option for a markup language element tag (e.g., "body") and the user may select the class grouping icon to apply the corresponding class for the class grouping icon to a tag of the same type found within the rendered content in the presentation panel (e.g., class grouping for "body" tag may be applied to a "body" markup element selected in a rendered content work). The class groupings may be applied to edit markup language elements within a content work. Similar to a pattern library, a "class grouping" library may be provided to a user, as described in more detail with FIG. 6 and FIG. 7.

Figure 2:
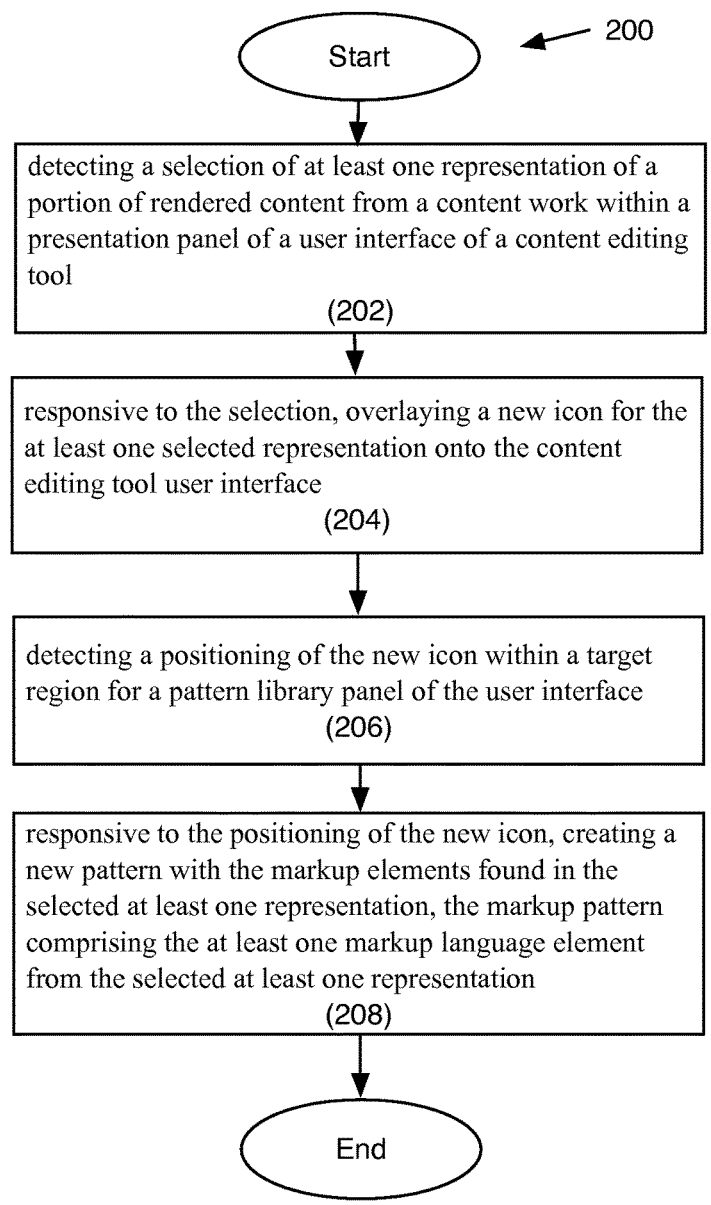
FIG. 2 is a flowchart depicting an exemplary process for a user interface in accordance with some embodiments of the invention.

FIG. 2 is an exemplary flowchart depicting a process 200 for a user interface in accordance with some embodiments of the invention. A selection of at least one representation for a content work within a presentation panel of a user interface of a content editing tool may be detected (202). The presentation panel displays a preview of a rendering of the content work within a target environment. The content (e.g., text, images) of the content work is rendered in accordance with a plurality of markup language elements for the content work. The selected representation is a portion of rendered content for the content work rendered in accordance with at least one markup language element from the plurality of markup language elements of the content work. Any visual indicator may be displayed on the user interface to designate the rendered content (and underlying markup language elements) as selected.

Responsive to the selection, a new icon for the at least one selected representation is overlaid onto the content editing tool user interface (204). For example, the new icon may be displayed "absolutely" using a cascading style sheet (CSS) and appear over and cover at least a portion of the user interface with out disrupting the display of the underlying user interface. Although an implementation is described with the overlay of a new icon onto the user interface to allow the user to provide further input as to what actions the user desires for the selected representations, those with skill in the art will recognize there are other implementations for selecting portions of rendered content of a content work and designating or providing input to request incorporation of the underlying markup language elements and content data for the rendered content into a pattern.

A positioning of the new icon within a target region for a pattern library panel of the user interface is detected (206). The positioning of the new icon within the target region indicates that the user desires to create a new pattern with the selected representations for rendered content. In some embodiments, the new icon may be positioned within a target region of a class grouping library panel of the user interface to indicate that the user desires to create a class grouping for a markup language element, as described in more detail with FIG. 7.

In certain embodiments, the user may select additional representations in presentation panel 102 and add them to an existing pattern to create an augmented pattern. For example, a pattern may be modified using the following steps:

A second selection of at least one additional representation for a content work is detected within the presentation panel, wherein the at least one additional representation is associated with at least one additional markup language element.

Responsive to the second selection, a second icon for the at least one additional representation is overlaid onto the content editing tool user interface.

A positioning of the second icon within the target region for the pattern library panel is detected, wherein the positioning of the second icon overlaps with one of the existing pattern icons in the pattern library panel.

Responsive to the positioning of the second icon, the markup pattern corresponding to the one of the existing pattern icons is modified to include the at least one additional markup language element from the selected at least one additional representation.

In certain embodiments, an existing pattern may be saved as a module, including, for example, metadata, such as an icon and semantic versioning, to an external library. Such an external library may be used for distribution of the pattern.

Although an implementation is presented with a target region at or near the pattern library panel, those with skill in the art will recognize that any target region on a user interface may be used to designate the desire of the user to create a new pattern. The pattern library panel has a menu with one or more pattern icons for markup patterns accessible for selection by the user and incorporation of the corresponding pattern for the pattern icon into the content work. A user may select a pattern icon and a position for the pattern icon within the presentation panel to trigger an insertion of one or more markup language elements (and/or content data) corresponding to the pattern icon into the content work.

The user may select the new icon and position the new icon within a target region for a user interface element, such as the pattern library panel element, to trigger creation of the new pattern. In some embodiments, a user interface indicator, such as a cursor or selected icons, may visually indicate a location or position on a display and thereby allow the user to indicate a desired position on the display with the user interface indicator. The user may also indicate selection (e.g., click mouse button) of various user interface elements (e.g., icons) at positions indicated by the user interface indicator. The movement of the cursor or other user interface indicator element may be received as input with the use of an input device (e.g., a mouse, touch pad, keyboard, motion controller/detector, touch pad, etc.) and/or indicated on a touch screen of a device, and the input may cause the user interface indicator to enter and be positioned within a target region. For example, input of one or more movements with the input device may be received that are translated to position the cursor or other user interface indicator element within the target region on a display and the positioning/entry into the target region may be detected.

In another example, a user may direct the cursor or other visual user interface indicator with her/his finger and/or a stylus across a touch screen into the target region. In yet another example, a user may make a gesture, wave a hand, lift a finger, and/or any other movement by a person that may be detected by the input device (e.g., a motion controller/detector, etc.) and interpreted as a movement of a cursor or visual indicator from one part of the display to a target region of the user interface. A gesture may be any motion that may be made with one or more fingers on a touchscreen. A motion detector may be used to detect movements of a person's body (e.g., hand, finger, arm, etc.) and interpreted as input to direct a cursor or other visual user interface indicator.

In some embodiments, event listener functionality may be provided with the browser, the operating system, and/or any other software installed on a device and/or server to capture events. When input, such as movements of an input device and/or any other interactions with software, is received from the input device and event listeners are utilized, then the movement and/or other interactions as well as the location of the cursor may be captured, logged as events, and notice may be provided to listeners registered to receive notice of the occurrence of particular events. By way of example, an event listener application programming interface (API) may provide functionality for registering a listener to capture and/or provide notice for when particular events occur. Continuing with the example, the listener may capture events and provide notice for positioning a cursor over a particular element of the user interface, removing a cursor position from hovering over a particular element, any other movements of a user interface indicator, and/or interactions with the user interface. When a particular type of event is captured, the listener for the particular type of event may receive notice of the occurrence, thereby allowing for detection of the particular type of event, such as a positioning of a new patter icon within the target region.

Those with skill in the art will recognize that there are many implementations for detecting the entry/positioning of the cursor or other indicator into a defined target region. For example, the current location of a cursor may be continually checked to determine if the cursor is in the target region, and if the cursor is in the target region, the positioning may trigger a response.

In some embodiments, positioning events may be defined with rules, such as rules requiring detection of a particular motion, a series of motions, a movement at a particular speed and/or velocity, a movement in a particular direction, hovering a cursor over a particular region of a user interface, and/or any combination thereof. Any definition or rule may define what constitutes a positioning event that may be detected and allow for a response. In some embodiments, artificial intelligence may be used to determine, learn, and/or help define what constitutes a movement for a particular individual. For example, artificial intelligence may be used to learn that a slight movement of an individual detected by a motion detector may constitute enough movement to position a cursor within a target region and represent a request to invoke display of the user interface element.

The target region may be designed and/or configured to be any portion of the user interface and/or display. For example, the target region may be defined to be in a particular portion of the user interface, such as where a user interface element of the user interface may be located when displayed. In some embodiments, the target region may be an area defined with a document element of an HTML (hypertext markup language) file, such as a "div" document element. The target region may be defined to be larger than the area of the display for the user interface element (e.g., the pattern library panel) to allow a user to overshoot or get near to the expected portion of the user interface for display of the user interface element. In some embodiments, the target region may have "dead space" areas that will not trigger a response. Areas of "dead space" may be defined to ensure that a user may interact with user interface elements located near the target region without triggering the display of the prompt to enter information about the new pattern. In other embodiments, the target region may be smaller or the same size as the user interface element triggered to be presented on the display in response to the movement of the cursor into the target region. The target region may be highlighted to indicate the location for the target region visually.

In certain embodiments, the user interface will attempt to predict the most useful selection for the user, sometimes by automatically selecting surrounding material. For example, if a user clicks within a cell in a table, the user interface may select the entire table as available for editing. In another example, if a user clicks anywhere within a figure, the user interface may select the figure including its associated caption and/or additional content related to the figure such as an image, widget, video, and the like. The user may "override" the expanded selection by clicking on the desired element in breadcrumb 606/706, discussed below.

Responsive to the positioning of the new icon, creating a new pattern with the markup elements found in the selected at least one representation (208). A prompt may be displayed on the user interface for creation of the markup pattern and allow the user to name the markup pattern. The markup pattern may be a pattern that is prepopulated with the at least one markup language element from the selected at least one representation of rendered content. The underlying markup language elements and/or content data for the selected representations may be incorporated into the new markup pattern. In some embodiments, the markup pattern markup language elements and content data may be added to a script file for the pattern library, and an icon for the new markup pattern may be added and presented within the pattern library to allow for incorporation of the new markup pattern into content works. By way of example, the script file may contain the following for a markup pattern:

```
<!-----Dropcap Knockout --->
<script type="application/pattern" id="dropcap-knockout"
data-label="Dropcap Knockout" data-category="Text">
<p><span class="dropcap-knockout">L</span> lorem ipsum dolor....</p>
</script>
```

Figure 3:
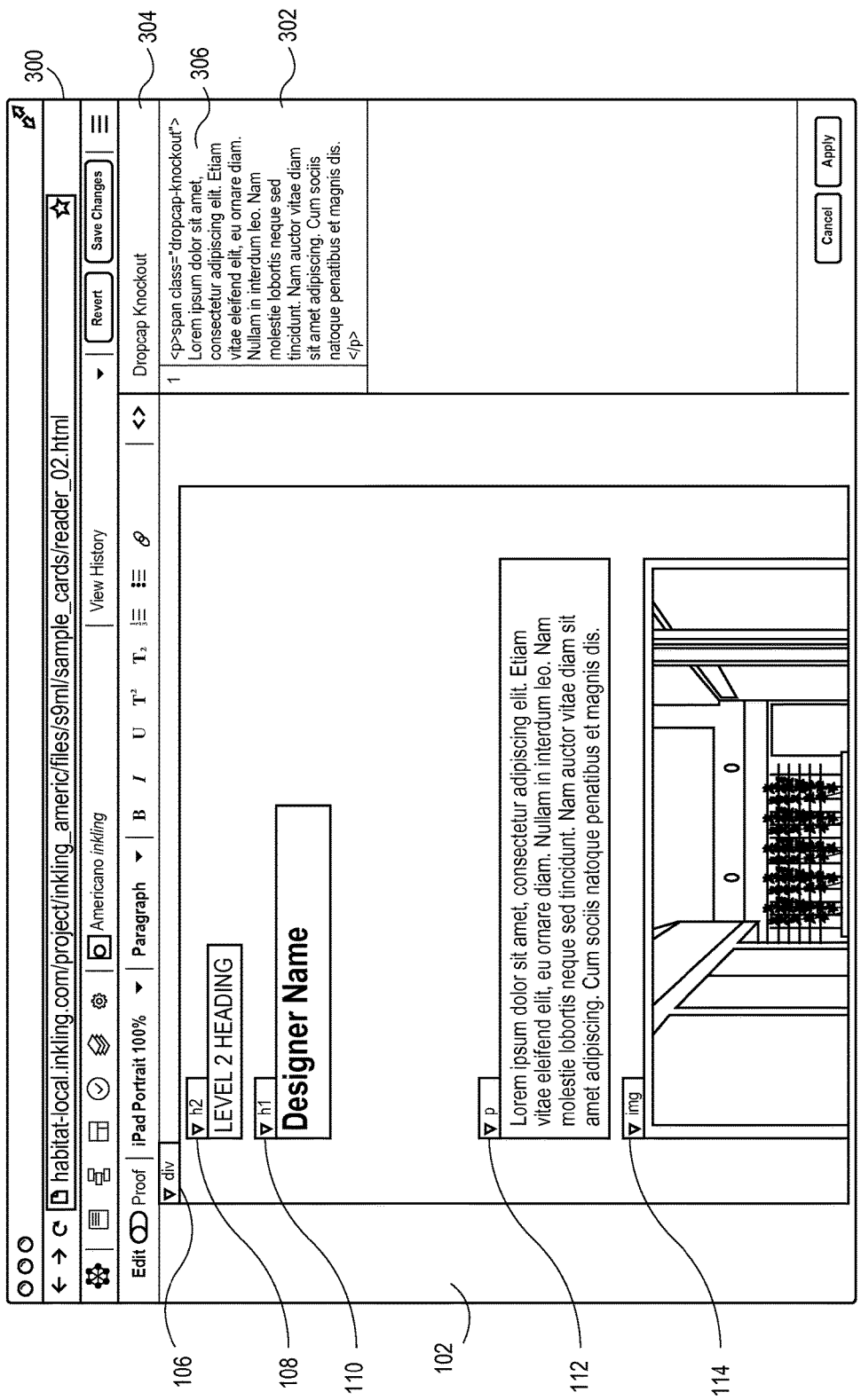
FIG. 3 is an exemplary user interface in accordance with some embodiments of the invention.

FIG. 3 is an exemplary user interface 300 in accordance with some embodiments of the invention. As shown in FIG. 3, a prompt 302 in the form of a panel may be presented to the user within the content editing tool user interface displaying a new pattern pre-populated with the markup elements 306 and/or content 306 from the selected representations (e.g., 106, 108, 110, 112, and 114) from the presentation panel 102. The user may specify the name of the new pattern (e.g., "Dropcap Knockout") as shown with 304. In certain embodiments, prompt 302 may permit the user to edit an existing pattern. For example, the user may add, change, or delete markup elements 306 and/or content 306 by directly editing the text defining the markup elements in prompt 302.

Figure 4:
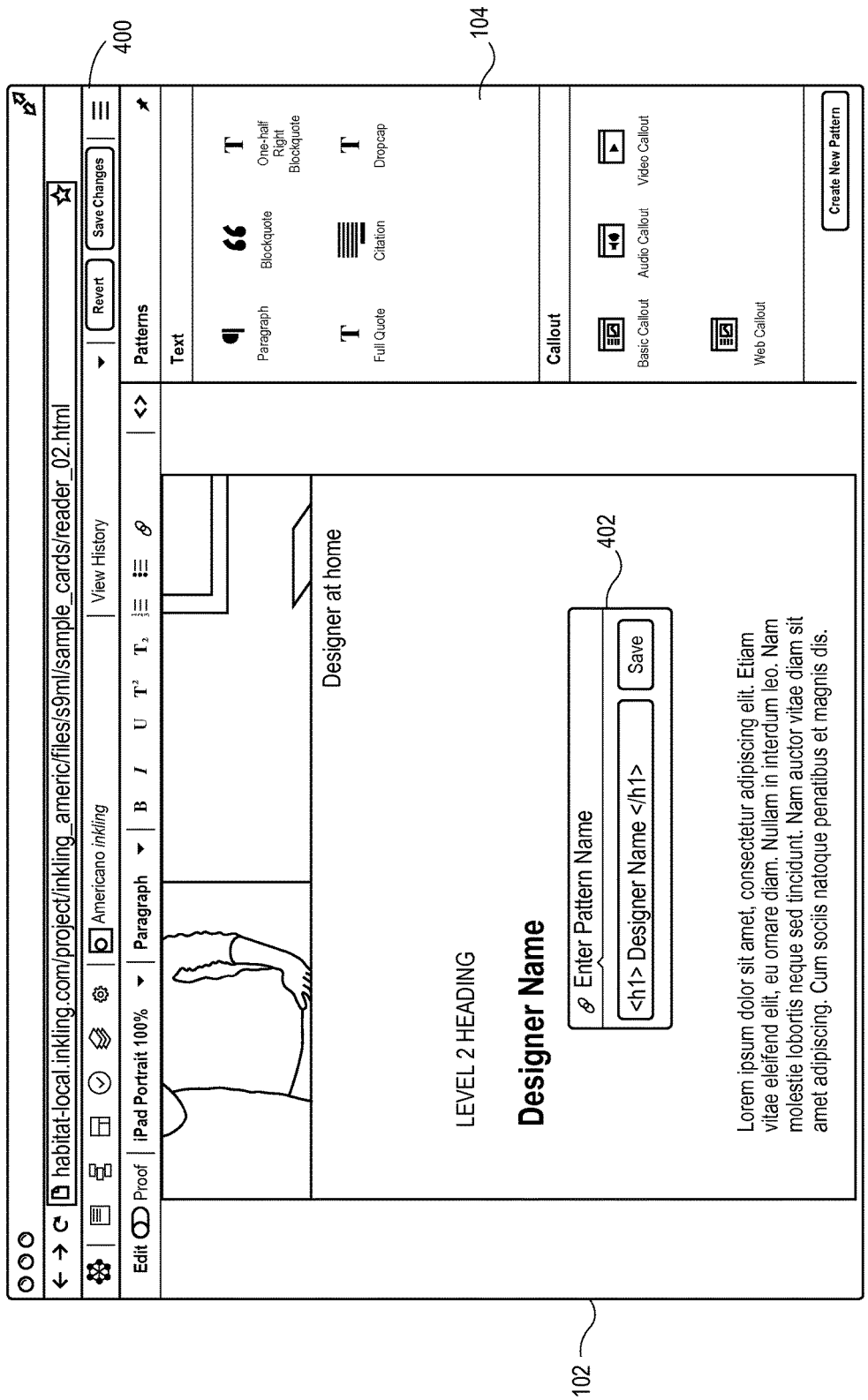
FIG. 4 is an exemplary user interface in accordance with some embodiments of the invention.

FIG. 4 is an exemplary user interface 400 in accordance with some embodiments of the invention. As shown in FIG. 4, a prompt 402 in the form of a panel may be presented to the user within the content editing tool user interface 400 for a new pattern pre-populated with the markup elements and/or content data from the selected representations. The user may input a new name for the pattern. In certain embodiments, user interface 300 or 400 may enable the user to change additional properties of a pattern, including the name 304, an associated icon (e.g. pattern icon 502), and/or associate comments or metadata such as version information or an author for the pattern.

Figure 5:
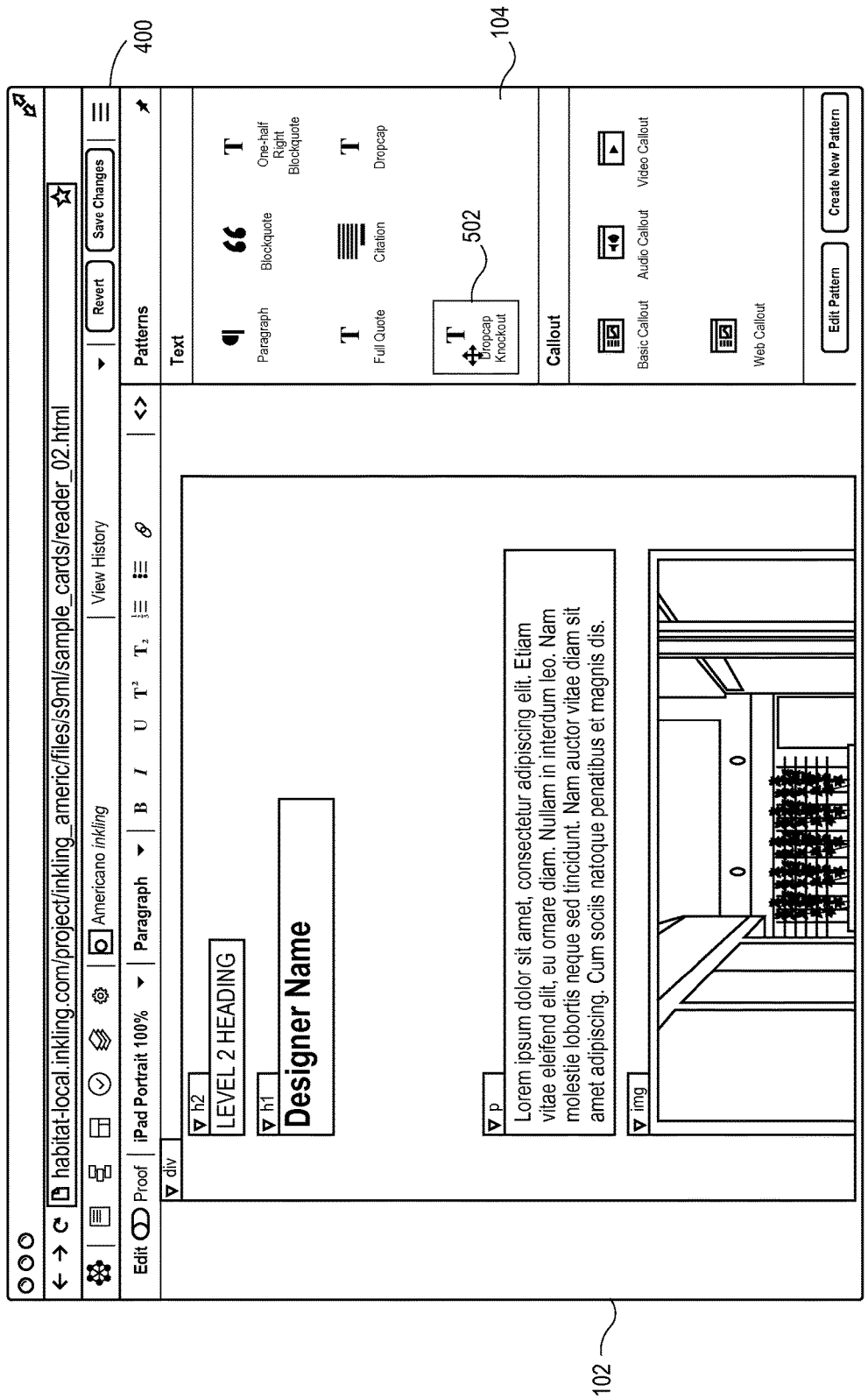
FIG. 5 is an exemplary user interface in accordance with some embodiments of the invention.

FIG. 5 is an exemplary user interface 500 in accordance with some embodiments of the invention. A new pattern icon 502 may be provided within the pattern library panel 104 for selection and insertion of the corresponding markup elements and content data for the pattern.

Figure 6:
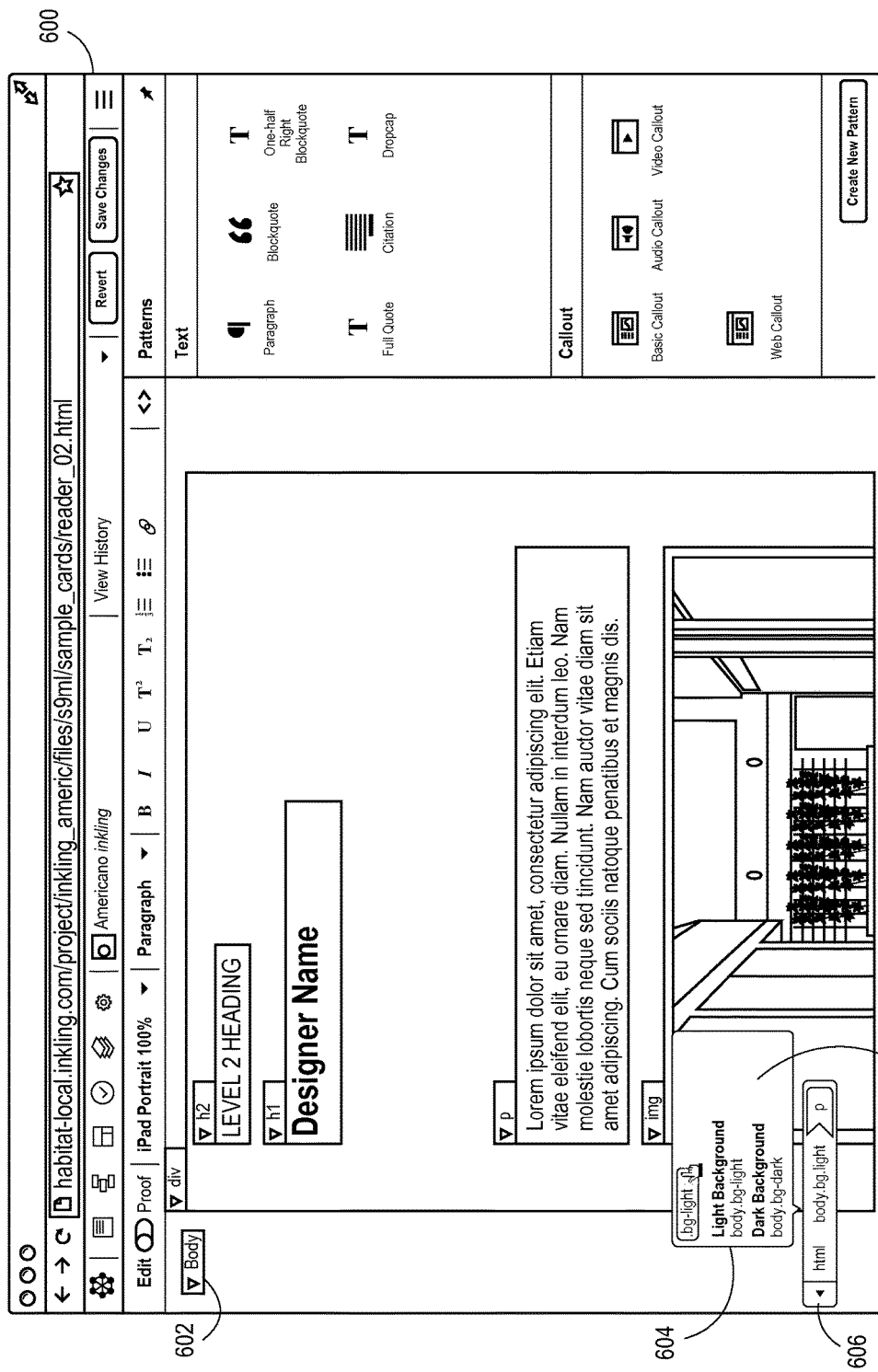
FIG. 6 is an exemplary user interface in accordance with some embodiments of the invention.

FIG. 6 is an exemplary user interface 600 in accordance with some embodiments of the invention. User interface 600 shows a breadcrumb 606 user interface element that aids the user in keeping track of their location in the document. The breadcrumb 606 is displayed horizontally across the user interface with a set of elements related to markup element "p." For example, the displayed elements may be a hierarchy of related elements for a selected markup element (e.g., parent relationship or any other relationship with the selected element "p"). The breadcrumb 606 allows the user to request to navigate to any of the markup elements within the content work by selecting the particular element name (e.g., double clicking the name "body") displayed in the breadcrumb 606. In some embodiments, the user is able to select a markup element (e.g., by hovering, single click on markup element in breadcrumb, or any other method of selection) within the breadcrumb 606, and trigger the display of a class grouping library 608 for the element. Thus a breadcrumb element is a user interface element that displays at least a hierarchy of selectable markup elements and other content.

The class grouping library 608 may be displayed as shown with a prompt 604, a panel (as described in FIG. 7), and/or within any other user interface element. The class grouping library 608 allows the user to select a class grouping (e.g., "Light Background," "Dark Background," etc.) associated with the selected markup element (e.g., "body") within a rendered content work, and the markup elements within the selected class grouping may be inserted for the selected markup element into the underlying markup files for the content work. The class grouping may be represented with a name (as shown) and/or an icon.

A script file may be maintained with a list of class groupings for a particular markup language element tag to present a library for an element tag to the user. As shown in class grouping library 608, titles of class groupings may be selected may be selected to allow for inclusion of the corresponding markup language elements and classes for the class grouping into the markup files for the content work to edit the selected markup language element in the rendered content work.

Figure 7:
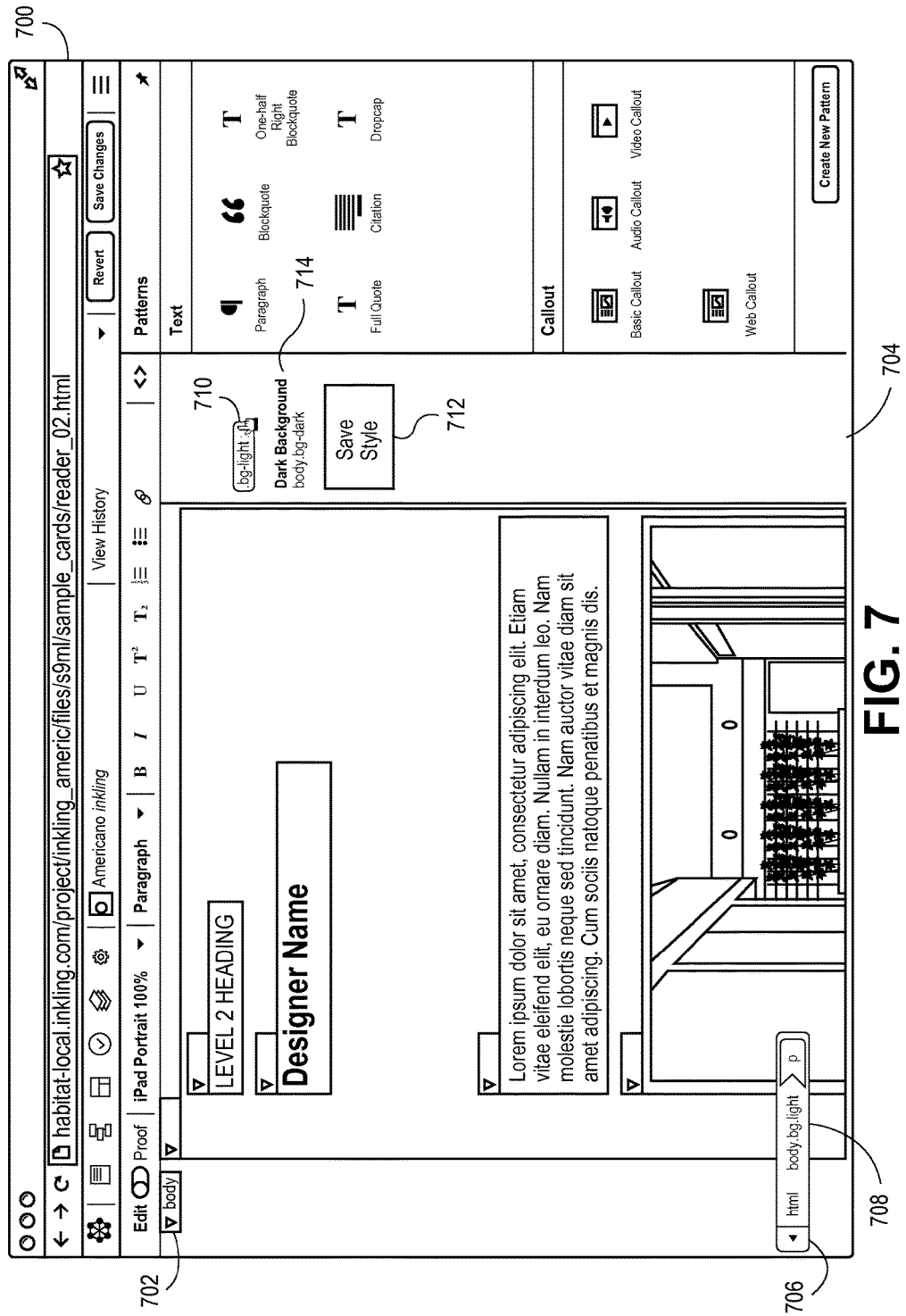
FIG. 7 is an exemplary user interface in accordance with some embodiments of the invention.

FIG. 7 is an exemplary user interface 700 in accordance with some embodiments of the invention. In FIG. 7, selection of a markup element 708 in a breadcrumb 706 triggers the display of a class grouping library panel 704. A user may select representations of content 702 for a markup language element (e.g., "body") and the markup language elements associated with the selected representation for the markup language element 702 (e.g., class "bg-light," indicated to the user with 710) may form a class grouping for a particular selected markup language element (e.g., "body"). As shown, the "class" markup language elements associated with the selected markup language element 702 may be used to form a class grouping for the "body" markup language element. When the representation for a class grouping of a markup element is selected and the user chooses to save the class grouping by selecting "Save Style" 712, then the new class grouping may be offered as an option to a user in the class grouping library panel 704 for that markup language element tag.

The new class grouping may be added to the class grouping library (as shown in "class grouping panel" 704), and the class grouping icons 714 (e.g., "Dark Background") may be selected from the class grouping library 704 for application of the markup for a class grouping to a particular markup language element within a presentation panel. The corresponding markup language elements for the class grouping represented with icon 714 may be inserted into the markup files for the underlying content work. By way of example, the user may select "Dark Background" class grouping to change the "class" for the selected "body" 702 markup language element tag within the markup files for the content work. That is, a user may edit the styles available for a class of markup element. Edits may include, for example, setting text color, background color, figure alignment, figure size, and opacity. Edits may also include setting or defining animations that may be responsive to user interface events such as a mouse-over, or setting or defining a script that may be interpreted by software running on the target device.

Figure 8:
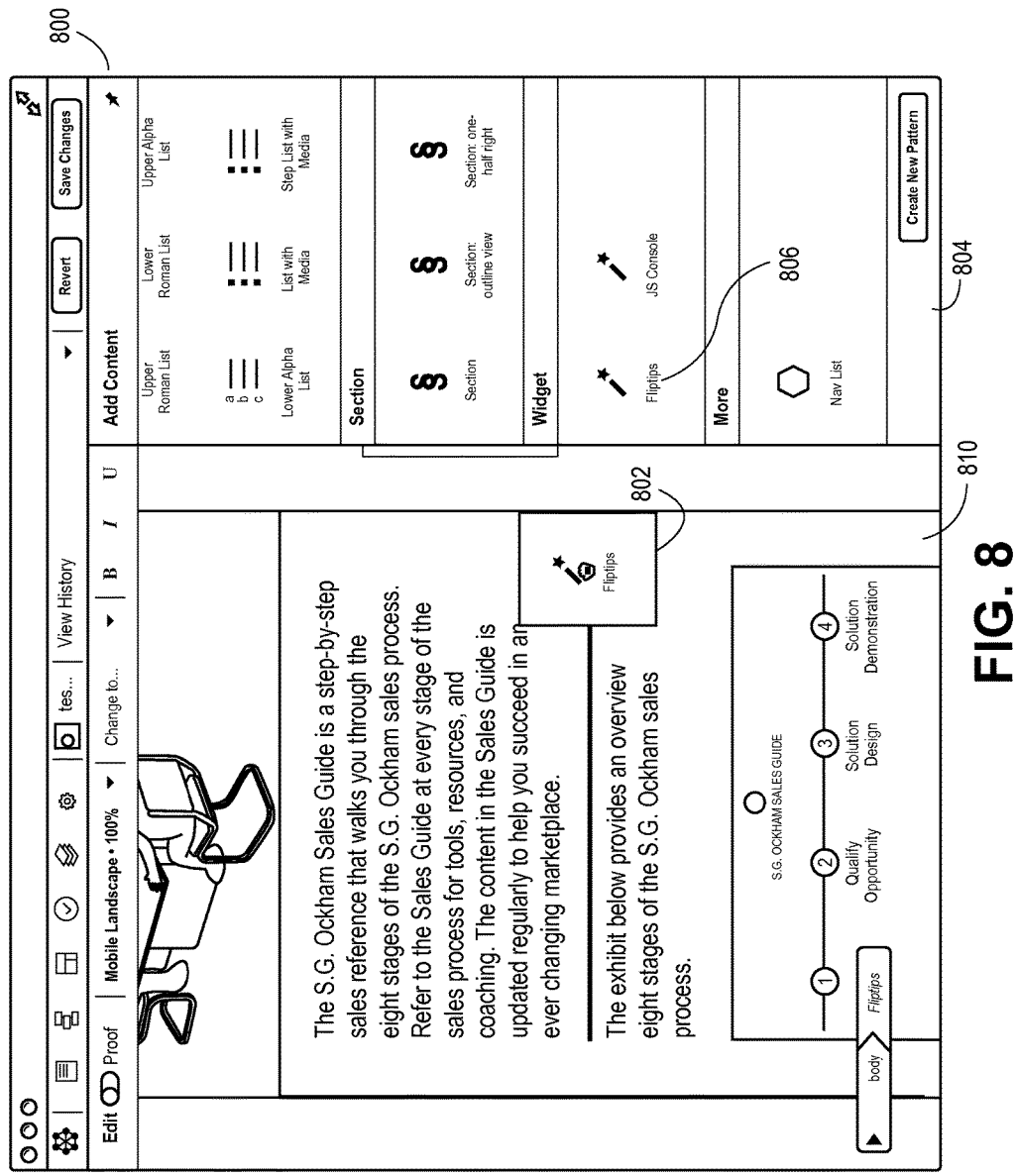
FIG. 8 is an exemplary user interface in accordance with some embodiments of the invention.

FIG. 8 is an exemplary user interface 800 in accordance with some embodiments of the invention. User interface 800 depicts a user interface with a pattern library panel 804 with pattern icons 806 for interactive content applications. As shown, a pattern icon 802 (e.g., "Fliptips" icon 802) may be selected from the pattern library panel 804 and dragged and dropped into a position within the rendering of the content work in the presentation panel 810.

In certain embodiments, available patterns may be grouped into categories within pattern library panel 804. For example, groups of patterns may include styled lists, text, widgets, and images. Widgets patterns may include embeddable objects with enhanced functionality, such as flash cards, multiple choice questions, images annotated with "pop" tips, and the like.

Figure 9:
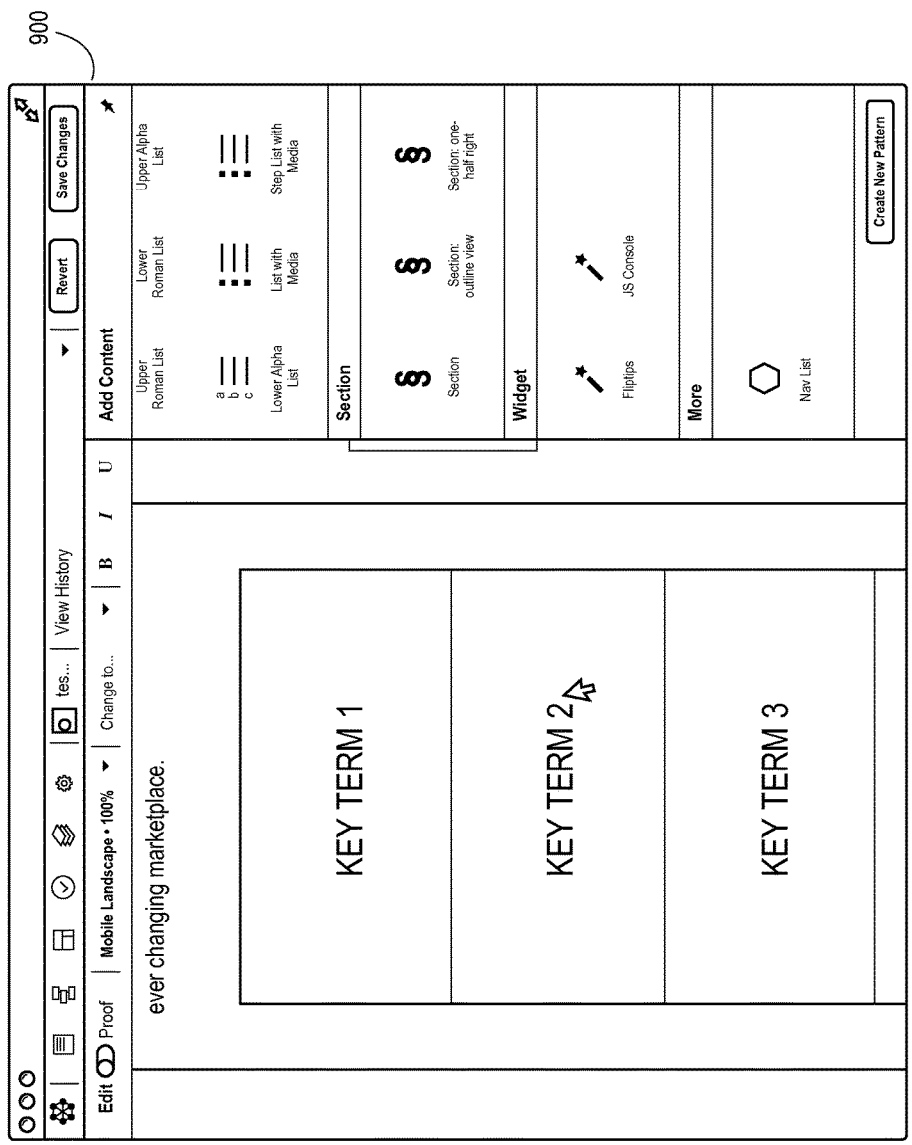
FIG. 9 is an exemplary user interface in accordance with some embodiments of the invention.

FIG. 9 is an exemplary user interface 900 in accordance with some embodiments of the invention. As shown in user interface 900, the interactive content application "Fliptips" inserted into the rendering of the content work.

Figure 10:
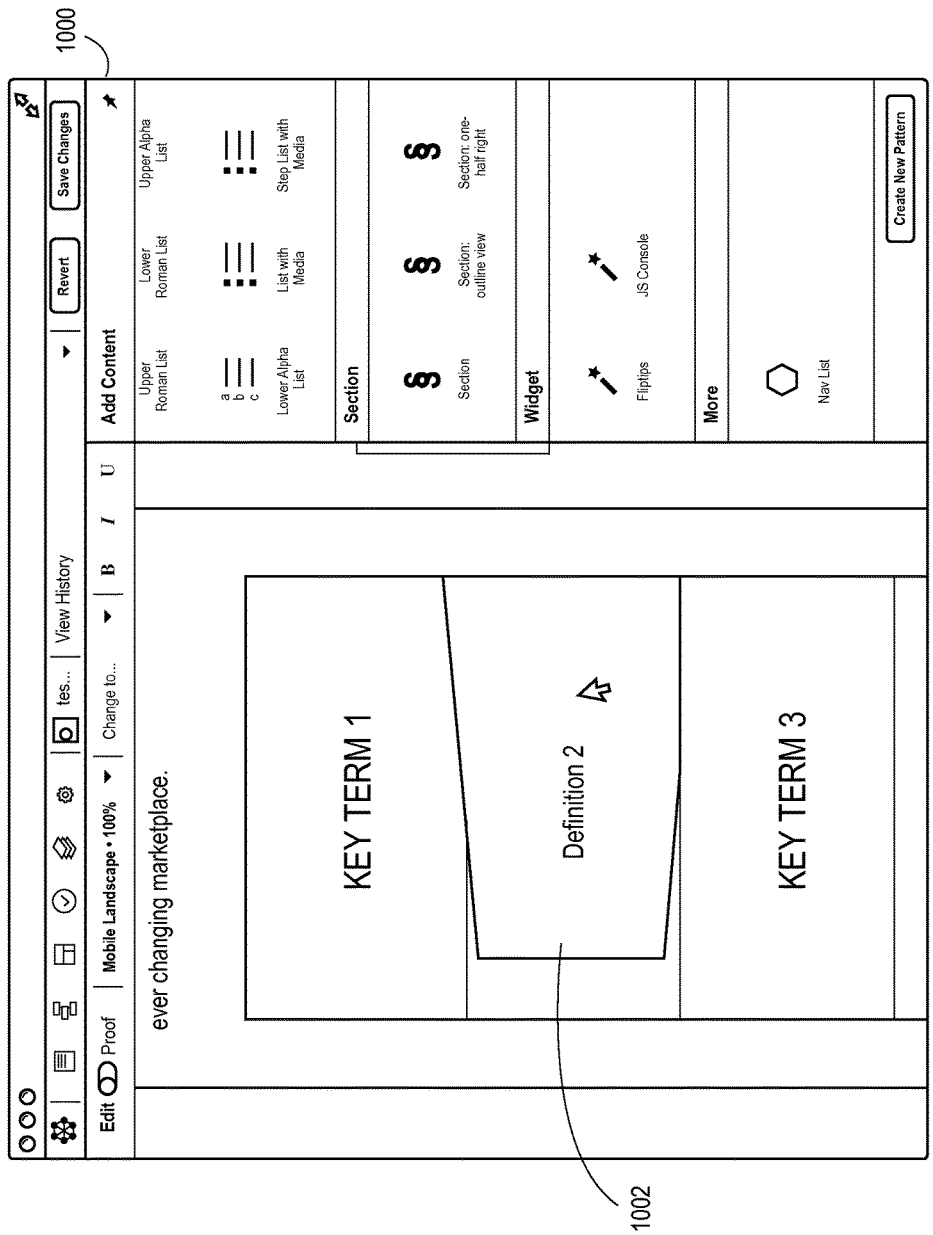
FIG. 10 is an exemplary user interface in accordance with some embodiments of the invention.

FIG. 10 is an exemplary user interface 1000 in accordance with some embodiments of the invention. As shown in user interface 1000, the user may interact with the interactive content application 1002 within the presentation panel 1002.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Further the procedures described herein may involve the use of various computer systems and computer readable storage media having computer-readable instructions stored thereon. FIG. 11 provides an example of a computer system 1276 that is representative of any of the computer systems or electronic devices discussed herein. Note, not all of the various computer systems may have all of the features of computer system 1276. Computer systems such as computer system 1276 may be referred to by other names, for example as hand-held devices, mobile devices, smart phones, multi-processor systems, microprocessor-based electronic devices, digital signal processor-based devices, networked computer systems, minicomputers, mainframe computers, personal computers, servers, clients, laptop computers, tablet computers, smart watches, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented by processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation. C#, C/C++, assembly language, markup languages (e.g., HTML, SGML, XML, VoXML), Javascript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

FIG. 12 illustrates a computer system 1276 from the point of view of its software architecture. Computer system 1276 may be any of the electronic devices or, with appropriate applications comprising a software application layer 1196, may be a computer system for use with the publishing tool described herein. The various hardware components of computer system 1276 are represented as a hardware layer 1198. An operating system abstracts the hardware layer and acts as a host for various applications 1202*a*-1202*m*, that run on computer system 1276. The operating system may host a web browser application 1206, which provides access for the publishing tool, etc.

Figure 13:
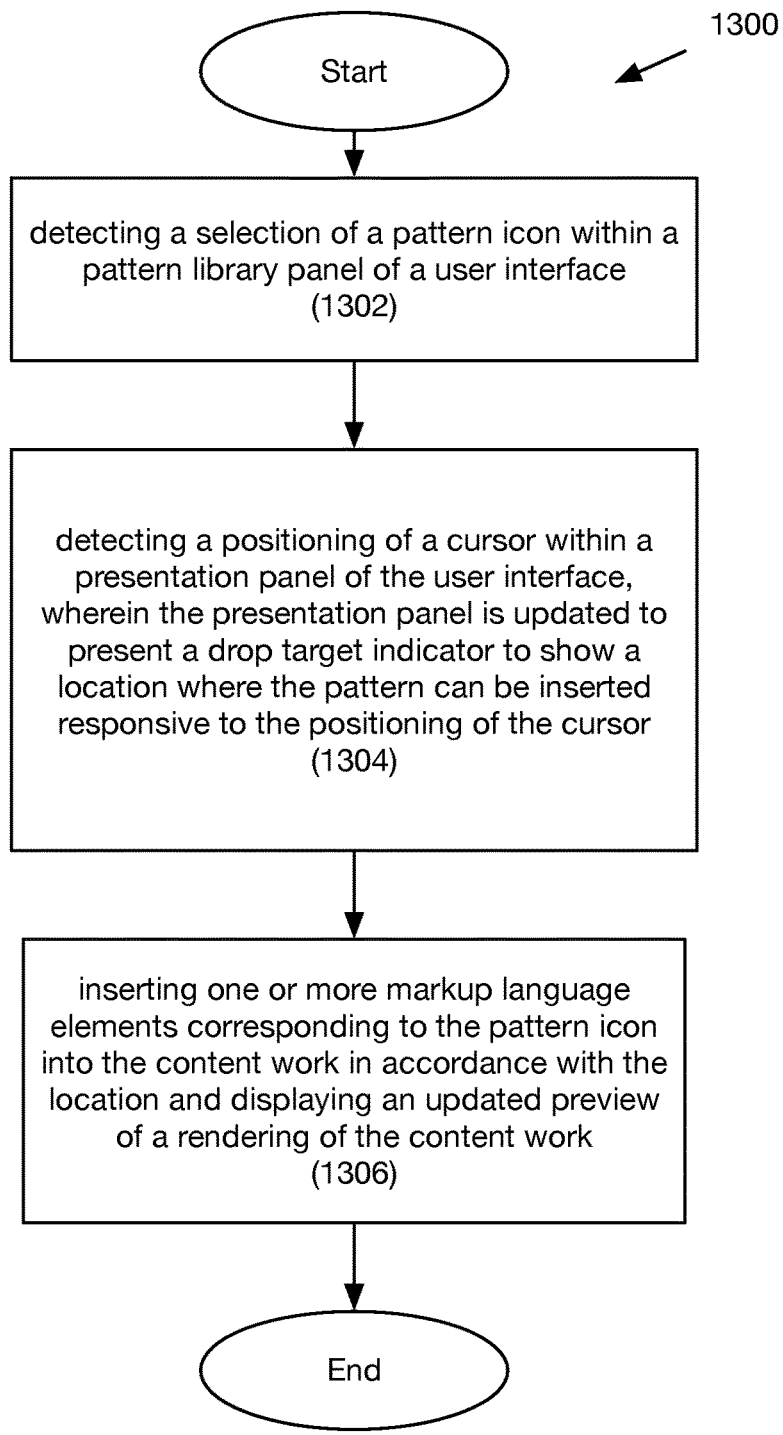
FIG. 13 is a flowchart depicting an exemplary process for a user interface in accordance with some embodiments of the invention.

FIG. 13 is an exemplary flowchart depicting a process 1300 for a user interface. As also described above, a user may select a pattern icon (e.g., pattern icon 502) and a position for the pattern icon within the presentation panel 102 to trigger an insertion of one or more markup language elements (and/or content data) corresponding to the pattern icon into the content work. In certain embodiments, a user may summon the pattern library panel 104 by moving the cursor to a trigger area, such as the right edge of presentation panel 102. For example, when the cursor is moved to the trigger area, pattern library panel 104 may slide out from the right side of the panel, and then may slide back into the right side of presentation panel 102 when the cursor leaves the trigger area.

In the embodiment shown in FIG. 13, first, a selection of a pattern icon (e.g., pattern icon 502) within a pattern library panel 104 of a user interface may be detected (1302). A wiggling icon may indicate that it is draggable. Thus in certain embodiments, when the cursor hovers over a pattern icon in the pattern library panel 104, the pattern icon will wiggle for a period of time, for a set number of wiggles (e.g., one, two, or five), or until the cursor leaves the icon. In certain embodiments, the appearance of the pattern icon may be changed when a user interface selection component such as a cursor is in a position where the pattern/pattern icon may be selected. The appearance of the cursor may also be changed when it is in a position where a pattern/pattern icon may be selected—for example, the cursor icon may change, and in certain embodiments the change may be dependent on the type of pattern that may be selected. A user may select an icon by clicking on it or by any other selection method known in the art.

Next, in certain embodiments, a positioning of a cursor within a presentation panel of the user interface is detected, and the presentation panel 102 is updated to present a drop target indicator to show a location where the pattern can be inserted responsive to the positioning of the cursor (1304). In some embodiments, the drop target indicator may comprise a user interface indicator, such as a cursor or selected icons, that may visually indicate a location or position on a display and thereby allow the user to indicate a desired position on the display with the user interface indicator. For example, the cursor may change shape when it is positioned over a location where the pattern can be inserted. In certain embodiments, a representation of rendered content such as 106 or 108 may be displayed using highlighting when the representation corresponds to the a location near the positioning of the cursor where the pattern can be inserted. In certain embodiments, a representation of rendered content corresponding to the current available location may be highlighted using an indication of the corresponding type of markup element, as shown in element 110 in FIG. 1. In certain embodiments, a representation of rendered content corresponding to the current available location may be highlighted by displaying a visible border around the element, as shown in element 110 in FIG. 1. In certain embodiments, a shape may be displayed to indicate where the pattern can be inserted, such as a horizontal line extending the length of a table row or table cell. In certain embodiments, the pattern may be "ghosted" into a location in the presentation panel, showing a preview of what the inserted pattern would look like.

In certain embodiments, the drop target indicator may comprise a breadcrumb element 706. Breadcrumb element 706 may be responsive to the current available location with respect to the positioning of the cursor in presentation panel 102, and may indicate where, in the markup hierarchy, the current available insertion location is by highlighting the immediate parent element for the location in breadcrumb 706. Such highlighting may include any visual indicator known in the art, such as changing the color of the parent element in breadcrumb element 706, bolding the text of the element label, or the like.

Next, in certain embodiments, one or more markup language elements corresponding to the pattern icon are inserted into the content work in accordance with the location and an updated preview of a rendering of the content work is displayed (1306). In certain embodiments, upon selection of an insertion location for the pattern, a prompt for information may be provided to the user. For example, if the pattern to insert comprises an image, the prompt may request the location of the image file or data to display. For example, if the pattern comprises a video, the prompt may request the location of a video or movie file to insert. For example, if the pattern comprises a table, the prompt may request the number of rows and columns in the table to be inserted.

Figure 14:
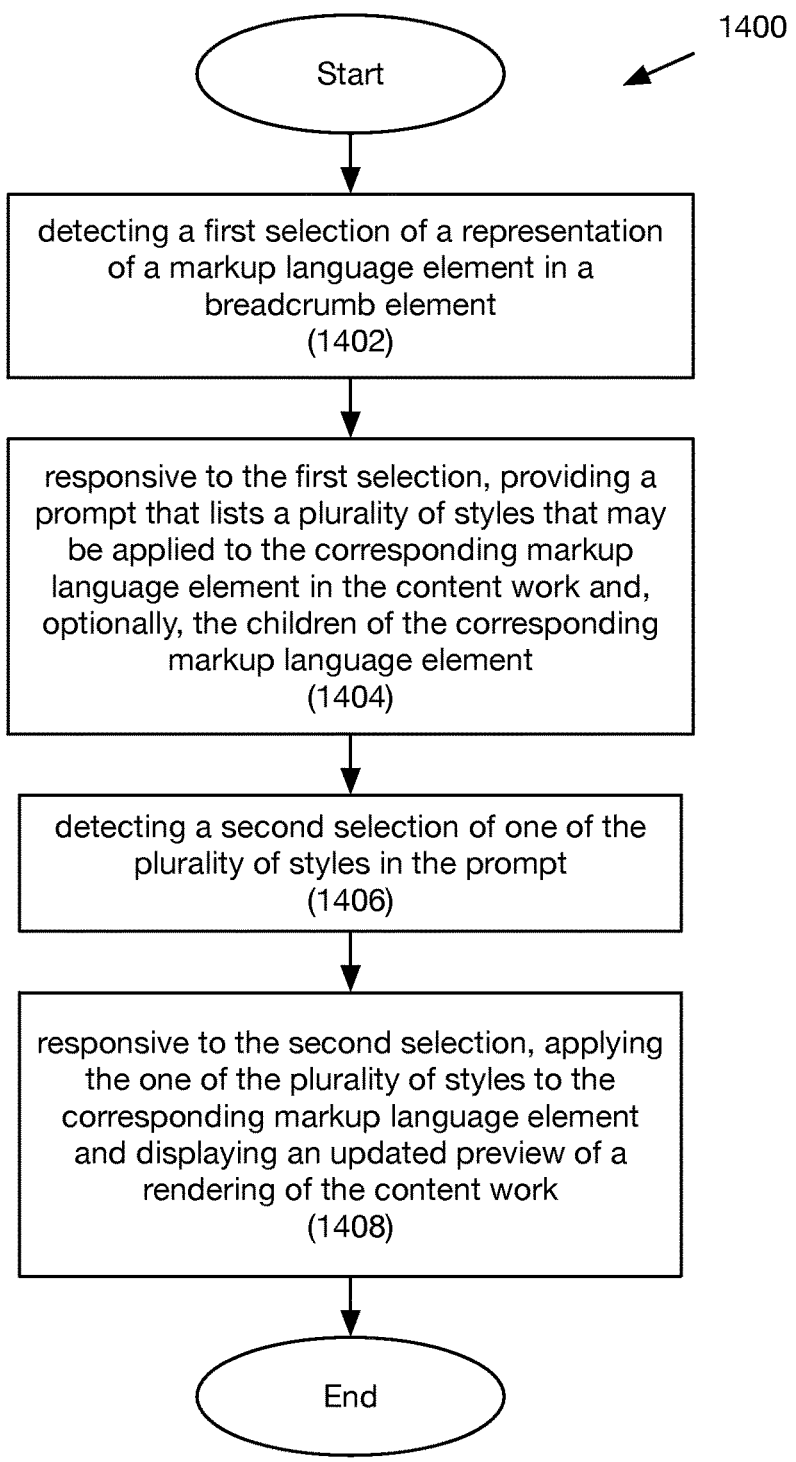
FIG. 14 is a flowchart depicting an exemplary process for a user interface in accordance with some embodiments of the invention.

FIG. 14 is an exemplary flowchart depicting a process 1400 for a user interface. For example, a user interface may enable editing a content work using a breadcrumb element using the following steps.

In certain embodiments, a first selection of a representation of a markup language element is detected in a breadcrumb element (1402). For example, the user interface may detect a mouse click within the items displayed in the breadcrumb element 706.

Responsive to the first selection, a prompt that lists a plurality of styles that may be applied to the corresponding markup language element in the content work and, optionally, the children of the corresponding markup language element, is provided (1404). For example, a particular style may affect the visibility of both the table and all the cells within the table. A different style may affect only the table.

A second selection of one of the plurality of styles in the prompt is detected (1406).

Responsive to the second selection, the one of the plurality of styles is applied to the corresponding markup language element and an updated preview of a rendering of the content work is displayed (1408).

Thus, methods and systems for converting content created by software tools, for example desktop publishing tools, in formats intended for use with print-based distributions of the content to formats suitable for use in connection with digital distributions of the content have been described.

What is claimed is:

1. A method for editing a content work using a breadcrumb element, comprising:
   presenting a preview representation for the content work within a presentation panel of a user interface of a content editing tool;
   detecting a presentation-panel selection of a first preview representation of a first markup language element in the presentation panel, wherein the selected first preview representation is a rendering of the first markup language element;
   responsive to the presentation-panel selection, displaying a selection of the first markup language element in a breadcrumb element overlaid over the presentation panel, wherein the breadcrumb element comprises a representation of a hierarchy of selectable markup language elements including a hierarchy representation of the first markup language element;
   detecting a breadcrumb selection of a representation of a second markup language element in the breadcrumb element;
   responsive to the breadcrumb selection, extending a prompt from the breadcrumb element that lists a plurality of styles that may be applied to the second markup language element in the content work and, optionally, the children of the second markup language element;
   detecting a prompt selection of one of the plurality of styles in the prompt; and
   responsive to the prompt selection, applying the one of the plurality of styles to the second markup language element and displaying an updated preview of a rendering of the content work in the presentation panel.

2. The method of claim 1, further comprising detecting a user request to edit the plurality of styles; and receiving a new style and/or updates to at least one of the plurality of styles.

3. The method of claim 1, wherein the plurality of styles includes specifying at least one of text color, and background color.

4. The method of claim 1, wherein the selection of a representation of the first markup language element or a third markup language element displayed in the breadcrumb element causes a corresponding selection of the corresponding representation of the first or third markup language element in the presentation panel.

5. The method of claim 1, wherein the plurality of styles includes specifying at least one of figure alignment, and figure size.

6. A computer system comprising a display and a processor configured to present a user interface on the display, the user interface comprising:
   a presentation panel for displaying a preview of a rendering of a content work; and
   a breadcrumb element for displaying a hierarchy of selectable representations of markup language elements;
   wherein:
   the user interface is configured to:
      detect a presentation-panel selection of a first preview representation of a first markup language element in the presentation panel, wherein the selected first preview representation is a rendering of the first markup language element;
      responsive to the presentation-panel selection, display a selection of the first markup language element in the breadcrumb element, wherein the breadcrumb element is overlaid over the presentation panel and includes a hierarchy representation of the first markup language element;

detect a breadcrumb selection of a representation of a markup language element in the breadcrumb element, responsive to the breadcrumb selection, extend a prompt from the breadcrumb element that lists a plurality of styles that may be applied to the second markup language element in the content work and, optionally, the children of the second markup language element;

detect a prompt selection of one of the plurality of styles in the prompt; and responsive to the prompt selection, apply the selected one of the plurality of styles to the second markup language element and display an updated preview of a rendering of the content work in the presentation panel.

7. The computer system of claim 6, wherein the user interface is configured to detect a user request to edit the plurality of styles; and to receive a new style and/or updates to at least one of the plurality of styles.

8. The computer system of claim 6, wherein the plurality of styles includes specifying at least one of text color, and background color.

9. The computer system of claim 6, wherein the plurality of styles includes specifying at least one of figure alignment, and figure size.

10. A non-transitory computer-readable medium storing computer-executable instructions, which instructions when executed by a processor cause the processor to perform steps comprising:

presenting a preview representation for a content work within a presentation panel of a user interface of a content editing tool;

detecting a presentation-panel selection of a first preview representation of a first markup language element in the presentation panel, wherein the selected first preview representation is a rendering of the first markup language element;

responsive to the presentation-panel selection, displaying a selection of the first markup language element in a breadcrumb element overlaid over the presentation panel, wherein the breadcrumb element comprises a representation of a hierarchy of selectable markup language elements including a hierarchy representation of the first markup language element;

detecting a breadcrumb selection of a representation of a second markup language element in the breadcrumb element;

responsive to the breadcrumb selection, extending a prompt from the breadcrumb element that lists a plurality of styles that may be applied to the second markup language element in the content work and, optionally, the children of the second markup language element;

detecting a prompt selection of one of the plurality of styles in the prompt; and responsive to the prompt selection, applying the one of the plurality of styles to the second markup language element and displaying an updated preview of a rendering of the content work in the presentation panel.

11. The non-transitory computer-readable medium of claim 10, the instructions further comprising: detecting a user request to edit the plurality of styles; and receiving a new style and/or updates to at least one of the plurality of styles.

12. The non-transitory computer-readable medium of claim 10, wherein the plurality of styles includes specifying at least one of text color, and background color.

13. The non-transitory computer-readable medium of claim 10, wherein the selection of a representation of the first markup language element or a third markup language element displayed in the breadcrumb element causes a corresponding selection of the corresponding representation of the first or third markup language element in the presentation panel.

14. The non-transitory computer-readable medium of claim 10, wherein the plurality of styles includes specifying at least one of figure alignment, and figure size.

* * * * *